US012244065B2

(12) United States Patent
Zhu et al.

(10) Patent No.: US 12,244,065 B2
(45) Date of Patent: Mar. 4, 2025

(54) DECOUPLED DIPOLE CONFIGURATION FOR ENABLING ENHANCED PACKING DENSITY FOR MULTIBAND ANTENNAS

(71) Applicant: JOHN MEZZALINGUA ASSOCIATES, LLC, Liverpool, NY (US)

(72) Inventors: Jiaqiang Zhu, Baldwinsville, NY (US); Wengang Chen, Liverpool, NY (US); Niranjan Sundararajan, Baldwinsville, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 0 days.

(21) Appl. No.: 18/507,428

(22) Filed: Nov. 13, 2023

(65) Prior Publication Data

US 2024/0235057 A1 Jul. 11, 2024

Related U.S. Application Data

(63) Continuation of application No. 17/552,674, filed on Dec. 16, 2021, now Pat. No. 11,817,629.

(60) Provisional application No. 63/128,550, filed on Dec. 21, 2020.

(51) Int. Cl.
*H01Q 21/06* (2006.01)
*H01Q 5/378* (2015.01)
*H01Q 21/26* (2006.01)

(52) U.S. Cl.
CPC ........... *H01Q 21/062* (2013.01); *H01Q 5/378* (2015.01); *H01Q 21/06* (2013.01); *H01Q 21/26* (2013.01)

(58) Field of Classification Search
CPC ...... H01Q 21/062; H01Q 5/378; H01Q 21/26; H01Q 21/06
USPC .......................................................... 343/797
See application file for complete search history.

(56) References Cited

U.S. PATENT DOCUMENTS

| | | | | |
|---|---|---|---|---|
| 9,698,486 | B2 | 7/2017 | Shooshtari et al. | |
| 11,563,272 | B2 * | 1/2023 | Bai | H01Q 5/45 |
| 2011/0291905 | A1 | 12/2011 | Liu | |
| 2018/0191083 | A1 | 7/2018 | Daojian et al. | |
| 2019/0081413 | A1 | 3/2019 | Xia et al. | |
| 2019/0280377 | A1 | 9/2019 | Zhang et al. | |
| 2020/0321700 | A1 * | 10/2020 | Wu | H01Q 19/10 |
| 2020/0335881 | A1 | 10/2020 | Le | |

OTHER PUBLICATIONS

Ding Can et al, "Achieving Wider Impedance Bandwith Using FullWavelength Dipoles", 2020 14th European Conference on Antenna And Propagation (EUCAP), EURAAP, Mar. 15, 2020, pp. 1-5.
European Patent Office, Extended European Search Report in corresponding application EP 21911910.4, mailed Nov. 8, 2024, 7 pages.

* cited by examiner

*Primary Examiner* — Hai V Tran
(74) *Attorney, Agent, or Firm* — Meunier Carlin & Curfman LLC

(57) ABSTRACT

Disclosed is a decoupling dipole structure that renders a midband dipole effectively transparent to a nearby lowband dipole. This not only improves the beam quality in the lowband without sacrificing beam quality in the midband, it also enables different lowband dipoles to be employed to customize the lowband performance of the multiband antenna without requiring a redesign of the midband dipoles or of the array face.

10 Claims, 6 Drawing Sheets

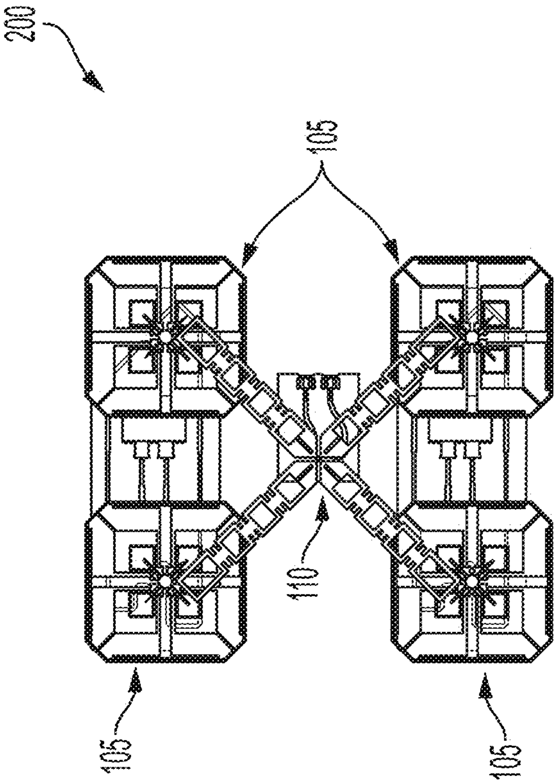
FIG. 2
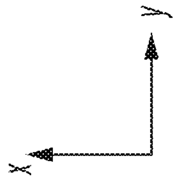

DECOUPLED DIPOLE CONFIGURATION FOR ENABLING ENHANCED PACKING DENSITY FOR MULTIBAND ANTENNAS

CROSS REFERENCE TO RELATED APPLICATIONS

This application is a continuation of U.S. patent application Ser. No. 17/552,674, filed Dec. 16, 2021, which claims priority to U.S. Provisional Patent Application Ser. No. 63/128,550, filed Dec. 21, 2020, which applications are hereby incorporated by this reference in their entirety as if fully set forth herein.

BACKGROUND OF THE INVENTION

Field of the Invention

The present invention relates to wireless communications, and more particularly, to multiband multiport antennas used in wireless communications.

Related Art

Several recent trends in cellular communications as put pressure on antenna design and performance. First, new spectrum is being made available, led by the additional licensing of sub-6 GHz frequency bands, as well as the advent of CBRS (Citizens Broadband Radio Service) and licensed use of C-Band, for use by both network operators and private networks. Second, developments such as Carrier Aggregation push for improved performance within and across existing and new bands: e.g., Low Band 617-894 MHz, Mid Band 1695-2690 MHz, and C-Band and CBRS 3.4-4.2 GHz. Third, beamforming and Massive MIMO (Multiple Input Multiple Output) further push demand for multiport operation within a single antenna.

Increase in bands and service providers has led to tower densification, in which more and more antennas as being mounted on existing cell tower infrastructure. This has in turn led to a demand for higher channel capacity (e.g., higher port count) antennas that are capable of operating in numerous frequency bands. This push for increased channel capacity puts additional pressures on antenna design. First, increased channel capacity requires high quality beam patterns for features such as Massive MIMO, 8T8R (Eight Transmit Eight Receive) schemes, and tighter sectorization.

A conventional solution to the design challenges of high channel capacity antennas as described above is to increase the size of the antenna. However, this causes considerable problems in terms of antenna wind loading and weight, with wind loading being a particularly severe problem. Accordingly, designing a high count multiport high channel capacity antenna requires that antenna designers find a way to more densely pack the antenna radiators of each of the different supported frequency bands into a constrained antenna area. This may be referred to as antenna densification or packing density.

Increasing packing density presents considerable challenges, primarily due to mutual coupling of dipoles of different frequency bands and the resulting cross polarization and other interference effects. An example of this is when radiation emitted by a lowband dipole causes excitation within portions of a nearby midband dipole, and the subsequent radiation emitted by the midband dipole couples back into the lowband dipole. The cross-coupled radiation may have a degraded polarization quality that, once coupled back into the lowband dipole, contaminates the isolation between the two radiated polarization states of the lowband dipole. This cross polarization interference can severely degrade beam quality and thus the performance of the antenna. As mentioned above, a conventional approach to preventing cross polarization is to increase the distance between the midband dipoles and the lowband dipoles, but this solution violates the requirement of minimizing antenna wind loading.

Accordingly, what is needed is a dipole design that minimizes cross polarization effects while enabling dipoles of different frequency bands to be packed together as closely as possible.

SUMMARY OF THE INVENTION

An aspect of the present invention involves a multiband antenna. The multiband antenna comprises a plurality of first dipoles configured to radiate in a first frequency band; and one or more second dipoles configured to radiate in a second frequency band, wherein each of the first dipoles has a radiator plate and a balun stem, each radiator plate having first side and a second side opposite the first side, a capacitive coupling element disposed on the first side, and a folded dipole element disposed on the second side, wherein the capacitive coupling element has an inductive trace that electrically couples to a radiator inductive trace through a via formed in the radiator plate, the radiator inductive trace coupled to the folded dipole element

BRIEF DESCRIPTION OF THE DRAWINGS

FIG. 2 illustrates an exemplary unit cell according to the disclosure.

DESCRIPTION OF EXEMPLARY EMBODIMENTS

Figure 1:
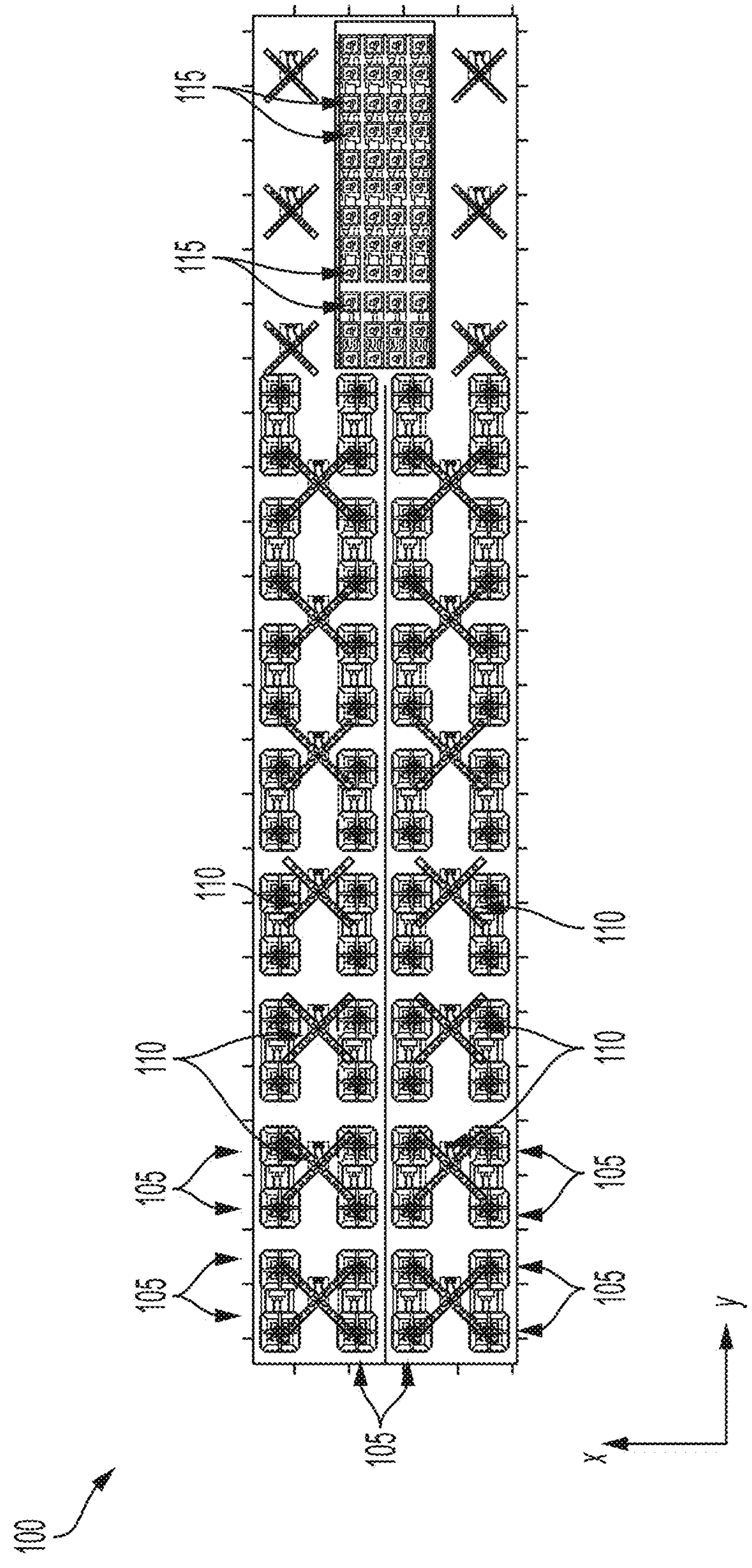
FIG. 1 illustrates an exemplary multiband array high packing density array face according to the disclosure.

FIG. 1 illustrates an exemplary multiband array high packing density array face 100 according to the disclosure. Exemplary array face 100 includes a plurality of midband dipoles 105, which may be arranged in four columns, each column along the antenna's y axis, and the columns adjacent along the x axis. Array face 100 may include two columns of lowband dipoles 110, which may be interleaved with the four columns of midband dipoles 105. Array face 100 may have an additional subarray of C-Band or CBRS dipoles 115. Exemplary array face 100 may have a width (along the x-axis) of 18 inches.

Array face 100 may be deployed as part of a multiport antenna, such as a 20-port antenna. In this example, the lowband dipoles 110 may be allocated four ports, one per +/−45 degree polarization of each of the two lowband dipole columns; the midband dipoles 105 may be allocated 8 ports, one per +/−45 degree polarization of each of the four midband dipole columns; and the C-Band/CBRS dipoles 115 may be allocated 8 ports to enable 8T8R operation. It will be understood that this port allocation is exemplary, and that other port allocations are possible and within the scope of the disclosure.

Although the illustrated exemplary array face 100 has four columns of midband dipoles 105 and two interleaved columns of lowband dipoles 110, it will be understood that variations to this configuration are possible and within the scope of the disclosure.

FIG. 2 illustrates an exemplary unit cell 200 according to the disclosure. Unit cell 200 may be an arrangement of four midband dipoles 105 and a single lowband dipole 110. The illustrated unit cell 200 of FIG. 2 may be similar to the four midband dipoles 105 and lowband dipole 110 in the "lower left" corner of array face 100 in FIG. 1.

Unit cell 200 may illustrate the challenge of densely packing the midband dipoles 105 with one or more lowband dipoles 110. For example, using conventional dipoles, the center-to-center distance along the x-axis must be at least 4 inches to prevent cross polarization. However, with the exemplary midband dipole 105 according to the disclosure, center-to-center distance between a given midband dipole 105 and a neighboring lowband dipole 110 may be as low as 2.75 inches.

Figure 3A:
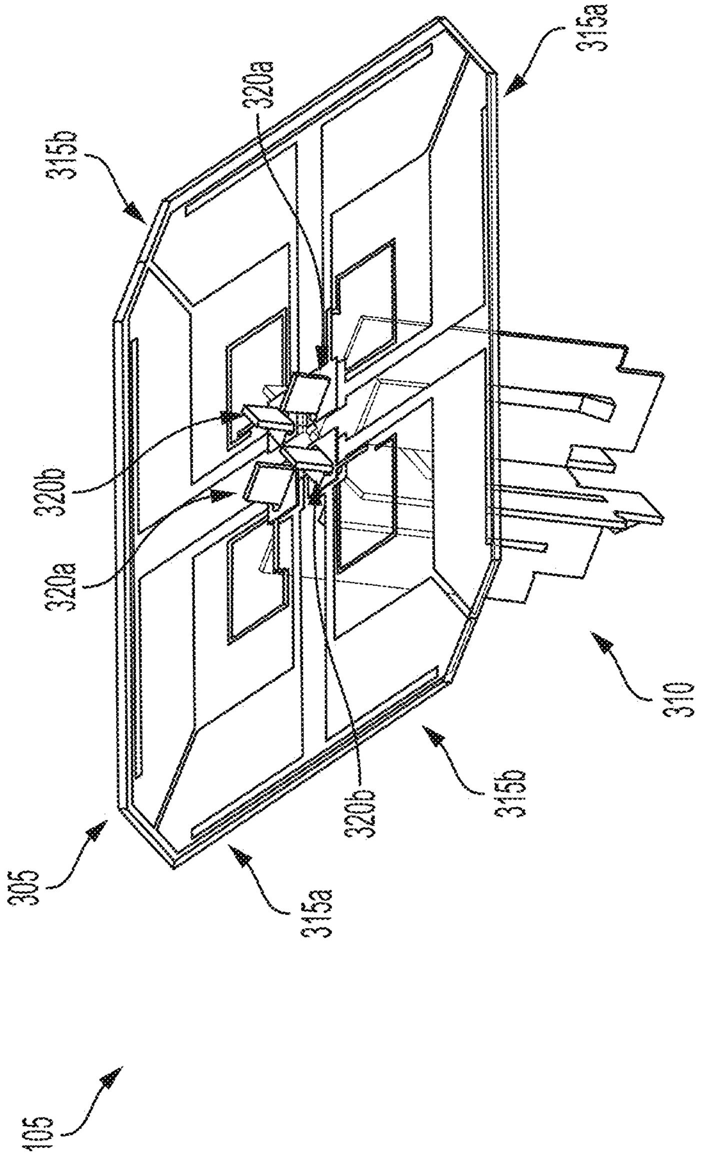
FIG. 3A illustrates an exemplary midband dipole according to the disclosure. As illustrated, the PCB (printed circuit board) of the midband radiator is transparent, providing a view of the conductive traces on its upper and lower sides.

FIG. 3A illustrates an exemplary midband dipole 105 according to the disclosure. Midband dipole 105 includes a radiator board 305 and a balun stem 310. Radiator board 305 may be formed of a PCB having conductors on both its upper and lower surfaces. For the purposes of illustration, the PCB of the radiator board 305 is depicted as transparent to provide a view of the conductive traces on its upper and lower surfaces. Radiator board 305 has two first polarization coupling elements 320*a* that are disposed on its upper surface; and two second polarization coupling elements 320*b* that are also disposed on its upper surface. The first polarization coupling elements 320*a* are disposed orthogonally to the second polarization coupling elements 320*b*, each respectively corresponding to a +45 degree and −45 degree polarization, and are illustrated in further detail in FIG. 3C.

Radiator board 305 has four conductive folded dipole elements 315*a* and 315*b*, disposed on its lower surface. Each of the two first polarization folded dipole elements 315*a* are capacitively and inductively coupled to a corresponding first polarization coupling elements 320*a*; and each of the two second polarization folded dipole elements 315*b* are capacitively and inductively coupled to a corresponding second polarization coupling elements 320*b*.

Folded dipole elements 315*a*/315*b* may be configured as disclosed in U.S. Provisional Patent Application HIGH PERFORMANCE FOLDED DIPOLE FOR MULTIBAND ANTENNA, Ser. No. 63/075,394, which is incorporated by reference as if fully disclosed herein.

In an exemplary embodiment, radiator board 305 may be formed of a PCB material such as ZYF300CA-C, having a thickness of 30 mil, and the conductive elements and traces formed on the PCB according to the disclosure may be formed of Copper having a thickness of 1.4 mil. It will be understood that such materials and dimensions are exemplary, and that variations to these are possible and within the scope of the disclosure.

Figure 3B:
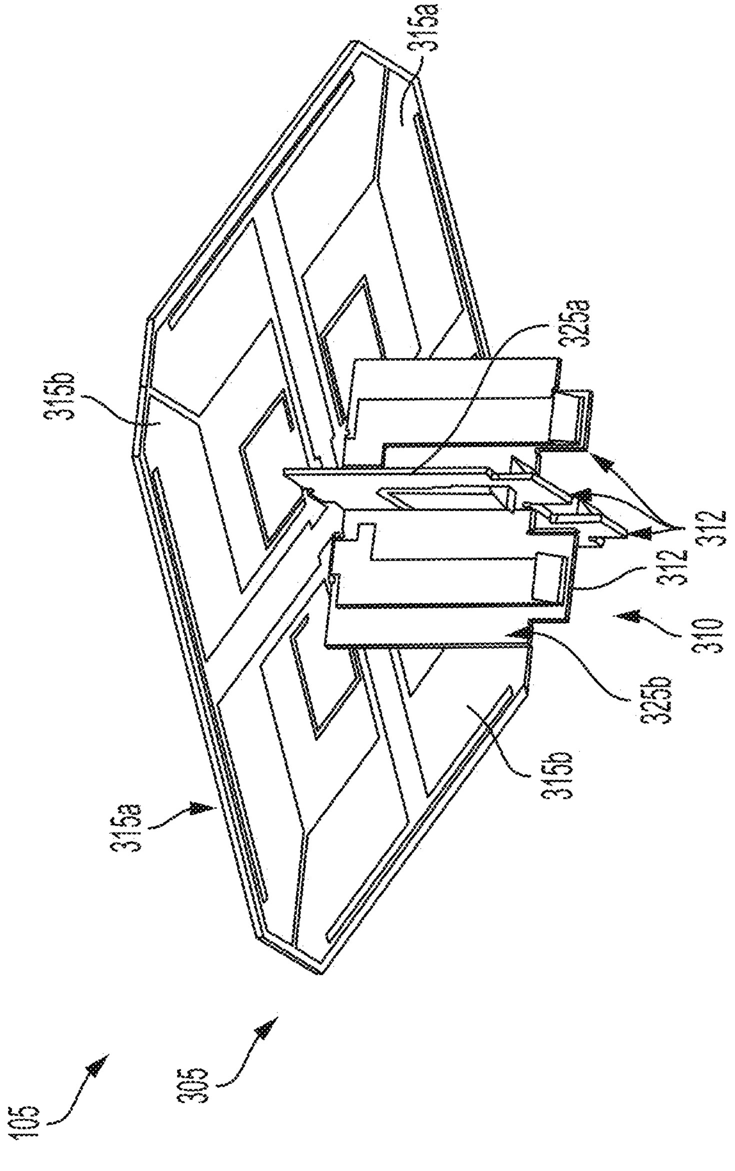
FIG. 3B illustrates the midband dipole of FIG. 3A, but from below, revealing the midband radiator balun stem. In this illustration, the dipole PCB is opaque, so that only the conductive traces on its lower surface are shown.

FIG. 3B illustrates the midband dipole 105 of FIG. 3A, but from below, revealing balun stem 310 and folded dipole elements 315*a/b* on the lower surface of radiator board 305. In this illustration, the PCB of radiator board 305 is opaque, so that only the conductive elements and traces on its lower surface are shown. Further to FIG. 3B, balun stem 310 has two balun plates: 325*a*, which provides a first RF signal to folded dipole elements 315*a* via first polarization coupling elements 320*a*; and 325*b*, which provides a second RF signal to folded dipole elements 315*b* via second polarization coupling elements 320*b*. Also illustrated are four signal feeds 312, two per balun plate 325*a/b*, which couple to a feedboard (not shown).

Figure 3C:
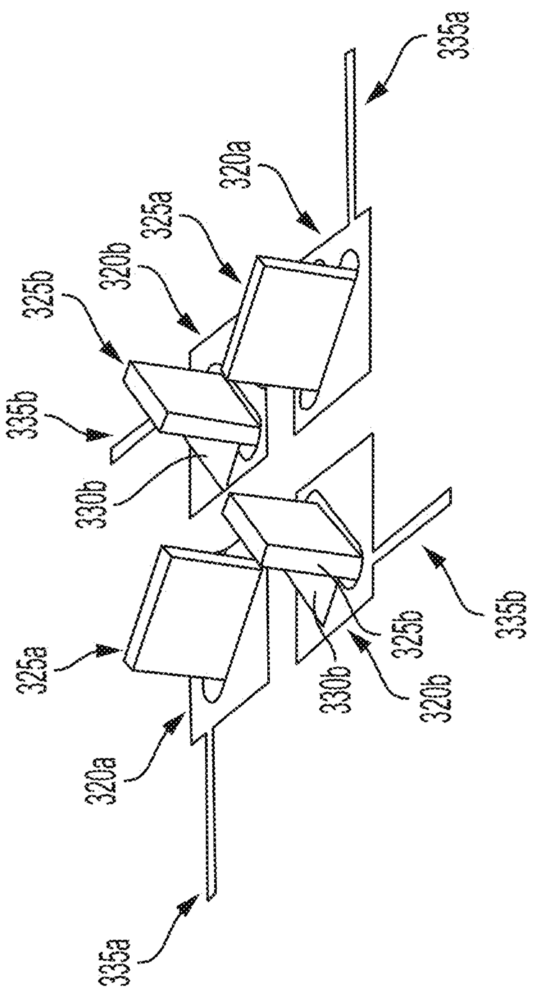
FIG. 3C is a closeup view of the upper portion of the exemplary midband radiator, illustrating the exemplary capacitive and inductive components disposed on the upper surface of the midband radiator PCB.

FIG. 3C is a closeup view of the upper portion of the exemplary midband radiator 105, illustrating the exemplary first polarization coupling elements 320*a* and second polarization coupling elements 320*b*. Illustrated are the mounting tabs of balun plates 325*a/b*, disposed on which are conductive traces (not shown). The conductive traces of balun plate 325*b* are conductively coupled to capacitive coupling elements 320*b* through solder joints 330*b*. Similarly, the conductive traces of balun plate 325*a* are conductively coupled to capacitive coupling elements 320*a* through solder joints (not shown). Capacitive coupling elements 320*a* each have an inductive trace 335*a*, which is explained further below.

Figure 3D:
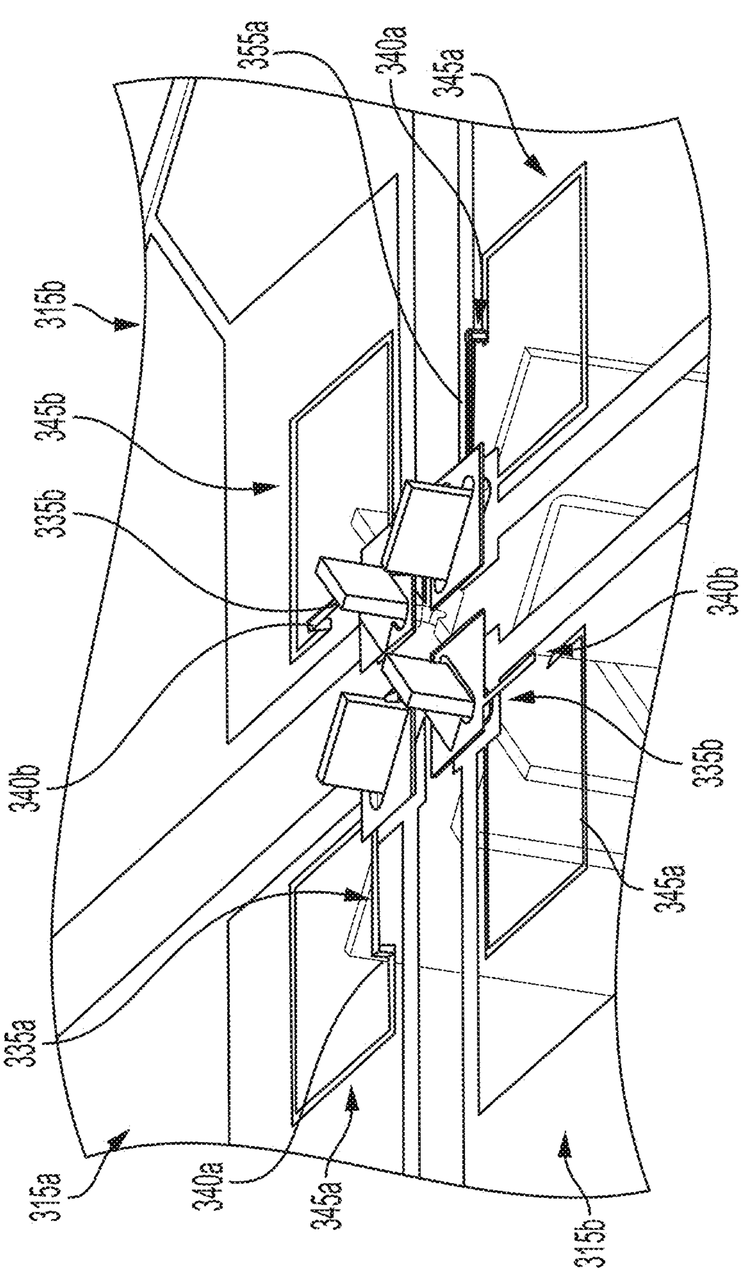
FIG. 3D is a view similar to that of FIG. 3C, but with the PCB rendered transparent, further illustrating the inductive traces on the upper and lower surfaces of the midband radiator PCB.

FIG. 3D illustrates the upper surface of radiator board 305, coupled to balun stem 310. FIG. 3D is a similar view to that of FIG. 3C, but with the PCB of radiator board 305 rendered transparent for purposes of illustration. As illustrated, folded dipole elements 315*a/b* are disposed on the lower surface of radiator board 305, and first polarization coupling elements 320*a* and second polarization coupling elements 320*b* are disposed on the upper surface. Further, each inductive trace 335*a/b*, as disposed on radiator board 305, couples to a via 340*a/b*, which then conductively couples to a respective radiator inductive trace 345*a/b*, which in turn couples to the respective folded dipole element 315*a/b* near the base, disposed on the opposite side of the PCB radiator board 305 from the respective polarization coupling element 320*a/b*, effectively forming an inductive loop.

Each inductive trace 345*a/b* may be disposed on the lower surface of radiator plate 305 such that it follows a path within an open area defined by the geometry of respective folded dipole element 315*a/b*.

Functionally, a first RF signal provided to the conductive traces of balun plate 325*a* is coupled through both solder joints 330*a* to first polarization coupling elements 320*a*. The first RF signal conducted to first polarization coupling elements 320*a* are capacitively coupled to respective folded dipole elements 315*a*. However, additionally, the RF signal is coupled from each folded dipole element 315*a* through its respective inductive trace 335*a*, via 340*a*, and radiator inductive trace 345*a*. This inductive coupling, in conjunction with the capacitive coupling between first polarization coupling elements 320*a* respective folded dipole elements 315*a*, decouples the midband dipole 105 such that it creates an CLC filter, which chokes out any common mode resonance, and making the midband dipole 105 effectively invisible to the lowband dipole 110. Further, the folded dipole structure (as opposed to a cross dipole) of the midband dipole 105 mitigates any subsequent insertion loss due to the decoupling structure according to the disclosure.

The decoupling provided by the disclosed midband dipole 105 renders it effectively invisible to the lowband dipole 110 to where different lowband dipoles may be employed in array face 100 to accommodate different specific licensed and unlicensed frequency bands as may be required for different network operators. Accordingly, different lowband dipoles 110 may be "pugged in" to array face 100 for different customers without the need to redesign the array face 100 or the midband dipoles 105.

Although the above discussion involved the design of a midband dipole that renders it effectively invisible to one or more lowband dipoles located in close proximity, it will be understood that these dipoles may correspond to other frequency bands whereby first dipoles of a first frequency range may have the disclosed dipole design such that it will be rendered effectively invisible to one or more second dipoles of a second frequency range, whereby the first frequencies are sufficiently higher than the second frequencies such that the first frequency band has a 0.4λ relation to the second frequency band. It will be understood that such variations are possible and within the scope of the disclosure.

What is claimed is:

1. A dipole for a multiband antenna, comprising:

a balun stem; and a radiator plate mechanically coupled to the balun stem, the radiator plate having a first side and a second side opposite the first side, four capacitive coupling elements disposed on the first side, and four folded dipole elements disposed on the second side, wherein each of the four capacitive coupling elements is capacitively and inductively coupled to a corresponding folded dipole element.

2. The dipole of claim 1, wherein each capacitive coupling element has an inductive trace that electrically couples to a radiator inductive trace through a via formed in the radiator plate, the radiator inductive trace coupled to a corresponding folded dipole element disposed opposite the capacitive coupling element.

3. The dipole of claim 1, wherein the four capacitive coupling elements comprise a first pair of capacitive coupling elements corresponding to a first polarization, and a second pair of capacitive coupling elements corresponding to a second polarization, and wherein the four folded dipole elements comprise a first pair of folded dipole elements corresponding to the first polarization and a second pair of folded dipole elements corresponding to the second polarization, the second polarization being orthogonal to the first polarization.

4. The dipole of claim 3, wherein each of the first pair of folded dipole elements are electrically coupled to adjacent folded dipole elements of the second pair of folded dipole elements by a conductive trace.

5. The dipole of claim 1, wherein the radiator plate comprises a PCB (Printed Circuit Board).

6. The dipole of claim 1, wherein the four capacitive coupling elements and the four folded dipole elements each comprise Copper.

7. The dipole of claim 6, wherein the four capacitive coupling elements and the four folded dipole elements each have a thickness of 1.4 mil.

8. The dipole of claim 1, wherein the balun stem comprises two balun stem plates that are mechanically coupled in a cross pattern.

9. The dipole of claim 8, wherein each of the four capacitive coupling elements is conductively coupled to a corresponding balun circuit trace diposed on a corresponding balun stem plate.

10. The dipole of claim 9, wherein the first side comprises an upper surface and the second side comprises a lower surface.

* * * * *